(12) United States Patent
Goldsmith

(10) Patent No.: US 10,289,143 B2
(45) Date of Patent: May 14, 2019

(54) AGENT-BASED MICROGRID ARCHITECTURE FOR GENERATION FOLLOWING PROTOCOLS

(71) Applicant: Steven Goldsmith, Rochester, MN (US)

(72) Inventor: Steven Goldsmith, Rochester, MN (US)

(73) Assignee: Michigan Technological University, Houghton, MI (US)

( * ) Notice: Subject to any disclaimer, the term of this patent is extended or adjusted under 35 U.S.C. 154(b) by 333 days.

(21) Appl. No.: 15/318,069

(22) PCT Filed: Jun. 12, 2015

(86) PCT No.: PCT/US2015/035705
§ 371 (c)(1),
(2) Date: Dec. 12, 2016

(87) PCT Pub. No.: WO2017/192110
PCT Pub. Date: Dec. 17, 2015

(65) Prior Publication Data
US 2017/0102726 A1  Apr. 13, 2017

Related U.S. Application Data

(60) Provisional application No. 62/011,134, filed on Jun. 12, 2014.

(51) Int. Cl.
*G05F 1/66* (2006.01)
*H02J 3/00* (2006.01)
(Continued)

(52) U.S. Cl.
CPC ............... *G05F 1/66* (2013.01); *G06Q 50/06* (2013.01); *H02J 3/00* (2013.01); *H02J 5/00* (2013.01);
(Continued)

(58) Field of Classification Search
None
See application file for complete search history.

(56) References Cited

U.S. PATENT DOCUMENTS

| | | |
|---|---|---|
| 2012/0143385 A1 | 6/2012 | Goldsmith |
| 2012/0283887 A1 | 11/2012 | Goldsmith et al. |
| 2017/0018922 A1* | 1/2017 | Sun .......................... H02J 3/005 |

OTHER PUBLICATIONS

Lentine, AL et al.; An intelligent electrical outlet for autonomous load control for electric power grids with a large percentage of renewable resources; IEEE, Power and Energy Society General Meeting, Jul. 22-26, 2012; pp. 1-8 [online]; http://ieeexplore.ieee.org/xpl/login.jsp?tp=$arnumber=6345438&url=http%3A%2F%2Fieeexplore.ieee.org%2Fxpls%2Fabs_all.jsp%3Farnumber%3D6345438> <DOI:10.1109/PESGM.2012.6345438>.

* cited by examiner

*Primary Examiner* — Whitney Moore
(74) *Attorney, Agent, or Firm* — Grumbles Law PLLC; Brittany Nanzig

(57) ABSTRACT

A system for predicting power and loads over a single, relatively short time horizon. More specifically, a system comprising a Storage Agent (S-agent) Cohort within a grid control society, wherein the system expands G and L intra-cohort protocols to allow the S-cohort to participate in power management of the grid by scheduling storage components in source or load roles as determined by the time-varying state of the power imbalance and by the risk-adjusting capacity margin relationship between the G and L cohorts.

20 Claims, 4 Drawing Sheets

(51) Int. Cl.
*H02J 3/38* (2006.01)
*H02J 5/00* (2016.01)
*H02J 7/00* (2006.01)
*H02J 7/34* (2006.01)
*H02J 7/35* (2006.01)
*H02M 3/04* (2006.01)
*H02M 7/44* (2006.01)
*G06Q 50/06* (2012.01)
*H02J 13/00* (2006.01)

(52) U.S. Cl.
CPC .............. *H02J 7/0052* (2013.01); *H02J 7/34* (2013.01); *H02J 13/00* (2013.01); *H02M 3/04* (2013.01); *H02M 7/44* (2013.01); *H02J 3/382* (2013.01); *H02J 3/383* (2013.01); *H02J 3/386* (2013.01); *H02J 7/345* (2013.01); *H02J 7/35* (2013.01); *H02J 2003/007* (2013.01); *Y02E 10/563* (2013.01); *Y02E 10/566* (2013.01); *Y02E 10/763* (2013.01)

FIG. 2
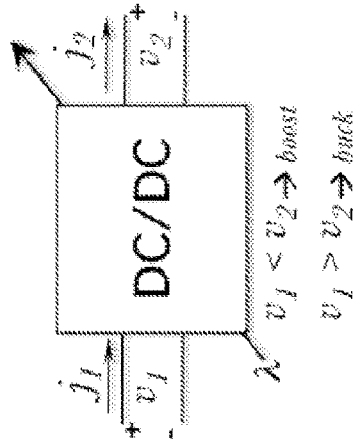
FIG. 3
$v_2 = v_b$ : bus voltage
$j_2 = j_{bi}$ : $i^{th}$ bus current
$v_1 = v_{1i}$ : $i^{th}$ converter source voltage
$j_1 = j_{1i}$ : $i^{th}$ converter source current
FIG. 1
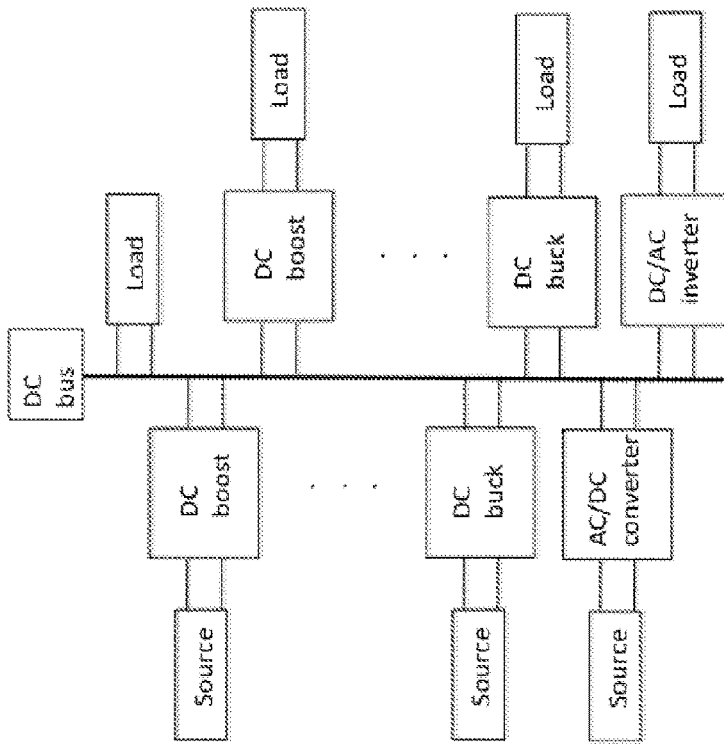

FIG. 5
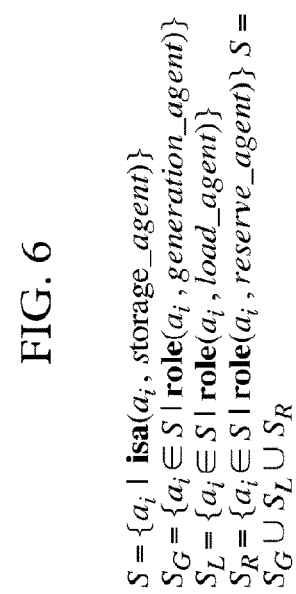
FIG. 6
$S = \{a_i \mid \mathbf{isa}(a_i, storage\_agent)\}$
$S_G = \{a_i \in S \mid \mathbf{role}(a_i, generation\_agent)\}$
$S_L = \{a_i \in S \mid \mathbf{role}(a_i, load\_agent)\}$
$S_R = \{a_i \in S \mid \mathbf{role}(a_i, reserve\_agent)\} \ S =$
$S_G \cup S_L \cup S_R$
FIG. 4
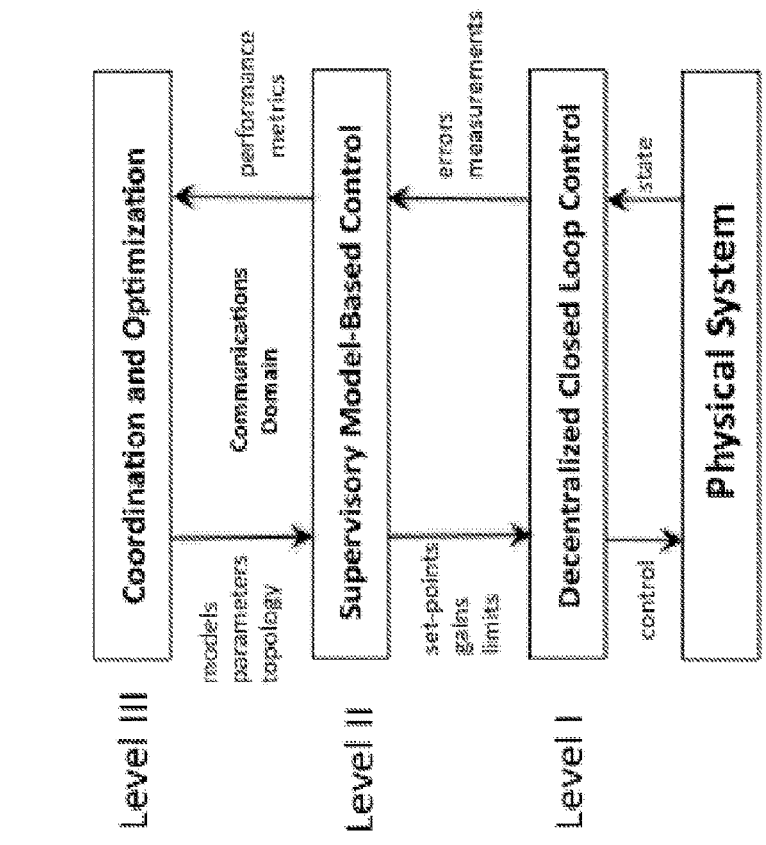

FIG. 9

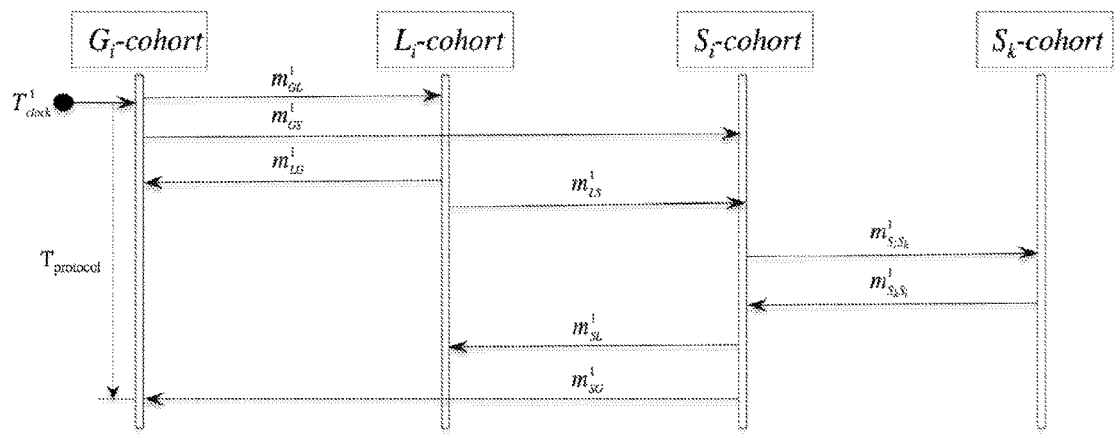

FIG. 10

| message | content | description |
|---|---|---|
| $m^1_{GL}$ | [$P_{genpred}$ $P_{genact}$] | Predicted and actual total generation power |
| $m^1_{LG}$ | [$P_{loadpred}$ $P_{loadact}$] | Predicted and actual total load power |
| $m^1_{LG}$ | [$P_{loaddiff}$ $P_{residual}$] | $P_{loaddiff} = P_{genpred} - P_{loadpred}$ : unserved load<br>$P_{residual} = P_{genpred} - P_{loadpred}$ : unused gen |
| $m^1_{S_iS_k}$ | [$P_{sgenpred}$ $P_{sloadpred}$] | Predicted total load and generation power available from *local* grid storage to $k^{th}$ grid storage cohort |
| $m^1_{S_kS_i}$ | [$P_{sgenpred}$ $P_{sloadpred}$] | Predicted total load and generation power available to local grid from $k^{th}$ grid storage cohort |
| $m^1_{SL}$ | [$P_{sloadpred}$ $P_{sloadact}$] | Predicted and actual total load power used by local storage |
| $m^1_{SG}$ | [$P_{sgenpred}$ $P_{sgenact}$] | Predicted and actual total load power supplied by local storage |

AGENT-BASED MICROGRID ARCHITECTURE FOR GENERATION FOLLOWING PROTOCOLS

GRANT FUNDING RECOGNITION

This invention was made with government support under grant number DE-AC04-94AL85000 awarded by United States Department of Energy. The government has certain rights in the invention.

BACKGROUND OF THE INVENTION

In current, basic forms of this system, there are two classes of distributed control agents: Generation Agents (G-agents) that control and interface individual generation assets and Load Agents (L-agents) that control and interface individual loads (or aggregations of loads). Virtualized (aggregated) generators and loads that are cohort-level abstractions (pluralities) for the G-agent and L-agent. The two-class multi-agent system can enact a power management protocol of the Generation Following Protocol (GFP) class that is conducted between G and L cohorts, called the GL-GFP. In GL-GFP, the L-cohort responds to messages advertising changes in the G-cohort aggregate generation capacity by shedding loads to match the specified generation capacity. Generation capacity is reduced by some capacity margin before broadcasting according to a risk policy based on estimates of peak and average loads derived from previous operation or direct analysis of individual load characteristics. The L-cohort loads are considered dispatchable loads that are apportioned according to a fixed convex set to match the risk-adjusted generation value.

SUMMARY OF THE INVENTION

The system presented herein includes a Storage Agent (S-agent) Cohort (plurality) within a grid control society, wherein the system expands G and L intra-cohort protocols to allow the new S-cohort to participate in power management of the grid by scheduling storage components in source or load roles as determined by the time-varying state of the power imbalance and by the risk-adjusting capacity margin relationship between the G and L cohorts.

BRIEF DESCRIPTION OF THE DRAWINGS

FIG. 1 illustrates a DC microgrid.
FIG. 2 illustrates a generic DC/DC 2-port.
FIG. 3 is a table showing the sensed variables for bus-connected converters.
FIG. 4 illustrates a three level agent architecture.
FIG. 5 illustrates the interaction between the G-cohort, L-cohort, and S-cohort.
FIG. 6 is a table showing the storage cohort roles for agents.
FIG. 9 illustrates GLS generation following protocol interactions.
FIG. 10 is a table showing G, L, and S messages.

DETAILED DESCRIPTION

Figure 7:
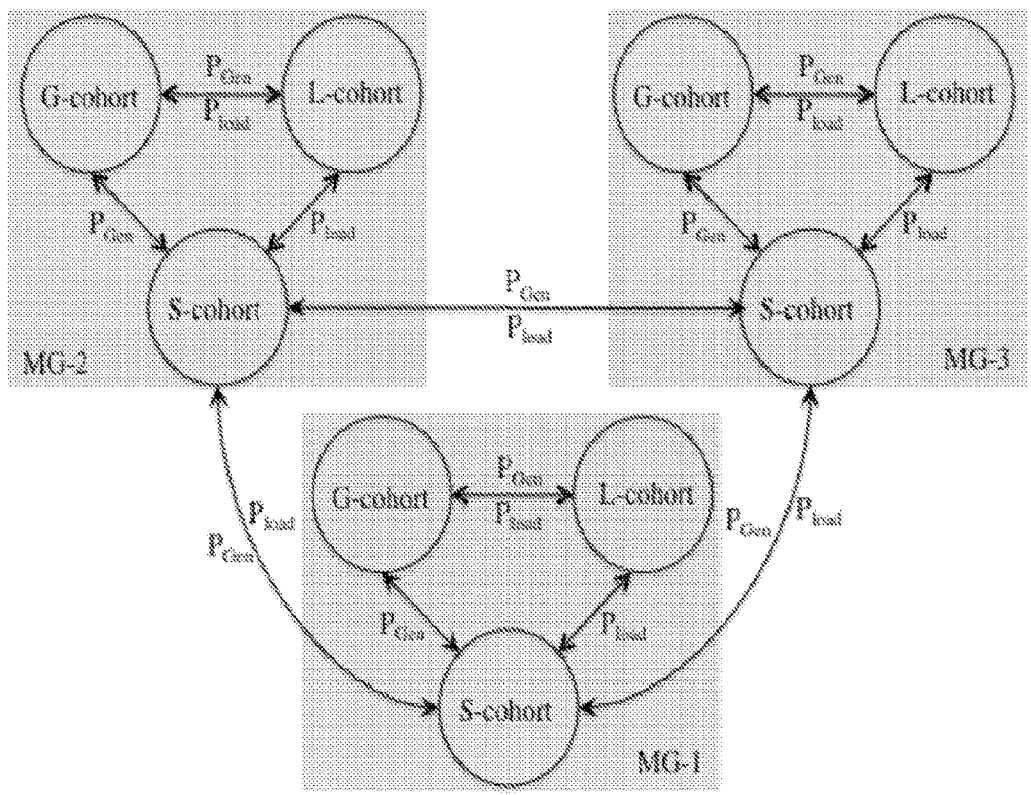
FIG. 7 illustrates S-cohort interconnected microgrids.

Various embodiments will be described in detail with reference to drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

The system presented herein comprises Generation Agent (G-agent), Load Agent (L-agent), and Storage Agent (S-agent) cohorts that are aggregates of their respective individual agent classes, to form a grid control society. The G and L intra-cohort protocols allow the S-cohort to participate in grid management by scheduling storage components in source, load, or reserve roles as determined by a coordination policy that responds to the time-varying state of the net power imbalance between all generators and loads and respects the capacity margin relationship between the G and L cohorts that accounts for one of many possible time-varying risk management policies.

The new GLS-GF protocol is a short-horizon protocol: it predicts power and loads over a relatively short time period in the future. Therefore, the agents do not represent long-range future power capacity and demand projections, and avoid NP-hard scheduling problems involving large numbers of tasks and resources. The S-cohort takes on the task of power sharing among interconnected microgrids, representing other grids as abstract storage devices connected by cross-bar proxies located in the respective S-cohort agent hardware inventory. The proxies are updated by messages traded between the S-cohorts to advertise available generation or load to the respective microgrids to include in the next power planning protocol, enabling bi-directional power sharing among microgrids. L-agent policies are introduced to enable load agents to manage a more realistic discrete set of non-dispatchable loads, a subset of which is predicted to be critical loads and not available for curtailment. Loads are not infinitely divisible, introducing the need to solve a form of the subset-sum (or 0-1 knapsack) problem that requires integer linear programming to find sets of loads that respect maximum or minimum limits on available power.

The complement of the critical subset is the set of elective loads, which are also selected according to an entitlement policy for partitioning residual power left over after the critical loads are met. Entitlement policies result in a convex set of coefficients that determine the allocation of post-critical generation available to each l-agent for elective loads. If the aggregate critical loads of the L-cohort cannot be met by the available generation, the deficit is signaled to the S-cohort, which then attempts to allocate available (in reserve) and suitably charged storage elements to the generation role, or to de-allocate (shed) storage elements that are in the load role and consuming generation power. If all critical loads and elective loads are satisfied and further residual power is left over, the surplus is signaled to the S-cohort, which then may choose to allocate depleted storage elements in reserve to the load role. If after allocating elements to be charged an ultimate power surplus still exists within a grid, the S-cohort may signal other microgrids with whom it has a power sharing agreement that it has excess power available, again according to an entitlement policy that apportions the power among possible candidate grids.

The preceding narrative describes but one path through the policy decision chain. There are many variations possible, depending on the particular grid equipment and service application. For example, military microgrids or grids that are wholly owned and managed by a single organization can adjust allocation and entitlement policies by fiat among the L and S cohorts to meet specific operational scenarios. Commercial microgrids that consist of federated generation and load assets have economic issues that drive entitlements and allocations and can only influence rather than specify demand behaviors. The prototype agent processes described herein represent the major decision processes that define the numerous policies, enabling different policies to be tested. The current approach works for a few interconnected grids, but is not optimal for large numbers of grids attempting to achieve global resilience to local variations through a complex interconnection network and power sharing arrangement. Scaling up to arbitrary many grids with specific interconnection topologies requires a more elaborate power brokerage apparatus and global optimization functions.

Autonomous DC Microgrids and Multi-agent Architectures

Autonomous microgrids are small-scale, self-operating power grids that operate only in "islanded" mode, independent of the bulk utility grid. Examples of autonomous grids are remote microgrids and military microgrids. Recent microgrid applications involve significant numbers of distributed generators based on variable sources such as wind turbines and solar PV arrays. Many applications of these microgrids involve loads that are inherently DC, such as data centers with primarily electronic loads such as computers and telecommunications equipment.

An active area of investigation is the application of networked distributed control agents to manage autonomous microgrid operations. This area of research is typically focused on using modern informatics technology to enable grid coordination through efficient, reliable, high-tempo interaction protocols conducted by various classes of control agents situated at generators, loads, storage devices, and distribution networks. Informatics-intensive architectures for grid control pose significant challenges to existing real-time distributed systems technology. Their design places inherently complex computations and distributed system protocols with deadline requirements within a feedback loop at some level, usually a higher level, of a hierarchical coordination system. The effects of these protocols on transient performance and stability are significant design issues. Moreover, from a control theoretic perspective, autonomous DC microgrids exhibit variable topologies and their component subsystems, usually DC-DC and DC-AC converters, are nonlinear. An approach to controlling autonomous microgrids involves distributed architectures composed of multiple software agents, each managing a generation, load, or storage element according to a compromise of local objectives and constraints that respect the particular equipment characteristics, with global objectives that maintain grid power balance and respond to contingencies. Because loads and sources are tightly coupled through the bus, effective coordination of global grid tasks such as generation and load scheduling, demand response, and storage allocation require partitioning and virtualization of groups of agents into coordinated ensembles that operate as a single "superagent," thereby reducing communications overhead incurred by full peer-to-peer messaging.

An Agent Cohort is a group of software agents whose functions, goals, and intentions are similar. Agents in a cohort behave cooperatively to coordinate grid services such as generation and load management. A virtualization process conducted by the cohort members creates the logical composite of individual agent members of the cohort that appears to operate as a single agent to other virtualized agents. Virtualization is a complex, emergent process, but is generally accomplished through the abstraction of a common interface and through data sharing protocols (aka interaction protocols) that enable timely, reliable, and synchronized replication of grid states, models, and operating parameters among individual cohort members.

There are several approaches to partitioning agents into groups and organizing the activities of its members into a coherent virtual agent, the most obvious being by grid function: generation, load, or storage. Combining distributed generation resources into a virtual power plant is a common theme in the microgrid domain, and a natural way to aggregate generation agents into a cohort. Aggregating load management agents into a single cohort is also an obvious choice. Storage agents, by virtue of their dual roles as both generators and loads, suggest two different partitions: assign agents to both generation and load cohorts and condition their behavior on a mode selector; or aggregate storage agents into a separate storage cohort. The following design makes the obvious choices for generation and load cohorts, and pursues the latter approach to storage agent aggregation. Each cohort participates in intercohort protocols to: 1) achieve a common view among the three virtual agents (G, L, and S agents) of the current global grid state by proper communication and aggregation of individual sensor measurements; 2) determine and agree upon a coherent action schema that achieves global objectives for the next operating epoch; and 3) coordinate the allocation and execution of individual control interventions enacted by member agents. These protocols are customized variations of well-established distributed consensus protocols that are now the backbone of the current cloud computing and web services phenomena.

Secure, fault-tolerant consensus protocols are complex and generally require multiple redundant rounds of message exchanges to approximate the state of common knowledge necessary for coordinated action when agent processes and communications links are unreliable. One major issue regarding the scalability of a given GLS design is the tension between the magnitude and rate of change in global source capacities and load power demands versus the time it takes to complete the intercohort protocols that compute compensatory policies for harmonizing those changes. Protocols that cannot keep up with changes cause destabilization of the grid within a few cycles.

Because of the complexity of the timing and distributed functionality, effective grid engineering requires a modeling and simulation capability that accounts for the dynamics of generation and load processes, agent organization, communications, and the physical behaviors of equipment and controls. This begins with the design of an agent society to inhabit the microgrid network infrastructure. The microgrid multi-agent society (MAS) is composed of a set of agents $M=\{a_1, a_2, \ldots a_n\}$, partitioned into the three classes: Generation Agents (g-agents), Load Agents (l-agents) and Storage Agents (s-agents). Each agent, regardless of class, represents a computational process coupled to an exclusive dependent electrical subsystem through sensors and actuators. All DC sources are interfaced to the bus through a DC/DC converter of some type, as shown in FIG. 1. Each converter is modeled as a two-port network with a control parameter $\lambda$, as shown in FIG. 2. FIG. 3 shows the standard 2-port sensor measurements for the bus-connected converters. Each agent executes a sampled-data control loop, taking measurements periodically and adjusting control parameters to maintain bus voltage and bus input/output currents to the agreed-upon operational specifications.

Agents are internetworked to communicate with certain other agents through a communications domain. All types of agents share a common functional organization in which tasks are partitioned according to the typical three-layer control hierarchy shown in FIG. 4. Specific instantiations of this architecture may differ in the allocation of subtasks among the three levels, but in general the sensing, actuation, and real-time control loops are allocated to Level I; time-sensitive, knowledge-based, and model-based supervisory control functions reside mid-hierarchy in Level II; and global coordination policies determining generation and load forecasting, storage allocation for power balance, and multi-grid power sharing contracts are enacted at Level III. Control loops at Level I operate autonomously according to algorithms, set points, gains, and limits provided by the supervisory function at Level II, without the need for in-the-loop communications between Levels II and I within each sample period. Updates to the Level I operating parameters occur asynchronously according to Level II events generated by model-based controls and cooperative control modules executing algorithms based on sensor and actuator states transmitted from Level I.

Level II events may also arise in response to Level III events representing changes in predicted generation and load resources, including those of other microgrids, to add or remove grid resources, or in response to grid failure situations. The Level III process must determine and enact timely interventions in response to exogenous influences that change the grid environment in ways that are beyond the operating envelope of the Level II and Level I processes. Agent reasoning at Level III is deliberative, based on predictive models for power production that use sensor measurements and historical records. The Level III interventions must be propagated down to the Level II and Level I processes in time to re-structure the grid membership, operating parameters, and operating constraints. While deadlines for Level III interventions are generally neither explicit nor deterministic, there are nonetheless time constraints for action beyond which the Level I-II grid structures will be incompatible (stale) with its environment and cause existential failure of the grid physical infrastructure. The determination of Level III interventions involves substantial computation and communication to conduct intra-cohort protocols in response to uncertain event distributions. The intracohort protocols conducted at this level represent the Level II and Level III processes described in FIG. 4.

At the highest level, the virtual agents conduct power flow planning protocols that attempt to harmonize stochastic generation processes (G) driven by conventional fueled generators and natural sources such as wind turbines and solar arrays, with stochastic load processes (L) driven by human and technological factors that create demand. Imbalances in generation and load over time are addressed by scheduling storage (S) elements to either supply power (energy) or sink power (energy) depending on the sign of the net difference. Moreover, storage allocation must account for future deficits in generation or load, a computationally hard problem if optimization of power balance is required, especially over constraints on the cost of storage equipment and operational lifetimes. The design of these interactive protocols to achieve optimal or admissible interoperation of G, L and S inventories involves prediction of variable generation sources and loads and NP-hard scheduling algorithms involving dynamical systems models. An initial approach that avoids complex scheduling is to focus instead on reactive protocols that select actions for the immediate future—a single short increment of time—and do not base action selection on future states or projected costs.

The reactive protocols are useful to study in their own right because they are design solutions to the problem of unexpected events such as equipment failures or natural disasters, events that require contingency actions on short notice that address short term objectives and costs. The reactive protocols in this design are either Intercohort Protocols (IrP) or Intracohort Protocols (IaP). Intercohort protocols are conducted among individual members of the cohorts, g-agents, l-agents, and s-agents. The protocols have two main objectives: 1) information sharing for cooperative control schemes; and 2) virtualization of the membership, from both the informatics perspective and the power flow perspective. Since all agents connect to the bus and influence the bus voltage, they are fully coupled through the bus relation and the information pattern for each cohort is usually a fully connected network. For example, every g-agent shares with every other g-agent its measured state variables, source and bus currents and voltages, and its control outputs. Every g-agent also shares its predictions for current and near-term power production, enabling the short-horizon reactive planning of power balance and production allocation to the respective agents. A g-agent can then perform sensor fusion operations to estimate the bus voltage and detect outliers, as well as estimate the total bus source current, the total bus load, and the source power contributions of every other g-agent. The s-agents and l-agents perform equivalent operations on their state measurements. The IrP protocols represent Level I and Level II functions.

The fundamental problem for the various cohort members is the attainment of a state of group knowledge regarding the aggregate future status of energy (power) supply and demand, a global knowledge schema that is suitable for determining a common global coordination schema for coordinating individual actions that achieve the target global state. Passing from individual to group, state variables and energy/power constraints are propagated bottom-up in FIG. 4. Passing from group to individual, allocations of agents to the bus and global parametric interventions are propagated top-down in FIG. 4. The source of common knowledge for every agent is the private sensory channel for measuring the bus voltage, $v_b$. If sensors are identical, i.e., equally precise and accurate with identical filters and identical noise characteristics, their readings are identical. Hence, all agents (G, L, S) have at all times synchronous common knowledge of $v_b$: $\forall t_k, iC_M v_b(t_k) = v_b(t_k)$ where $C_M$ is the common knowledge operator from epistemic logic. The direct sensory experience of the bus voltage allows every agent to gauge the primary global voltage constraint without requiring communication of local data over the network. The common knowledge of bus voltage is the basis for the decentralized control loops at Level I, which can operate without high-tempo interventions from Level II. The Level I agents still require the supervisory settings, but only asynchronously in response to changes in power flow allocation. The task of bus voltage regulation is accomplished by the G-cohort (and the G-recruited elements of the S-cohort) through the redundant bus voltage measurement sensors, one for each g-agent, that are ultimately used in some variant of feed-forward and/or feedback control strategy involving current programming of DC-DC converter input or output currents. The control structure, set points, gains, and limits of the control loops are determined by the model-based reasoning schemata among Level II agents and enacted by subsequent interventions to Level I agents. In all cases, the Level I agents regulate their respective efferent or afferent current flows to the bus based on the parameters provided by Level II.

Intracohort protocols are conducted among the virtualized G, L and S agents to determine the best allocation of generation and load resources to the bus. The virtual agents in a group M perform the following group functions: 1) condense(M), which creates a global synopsis of the individual voltages and currents of group M through statistical functions applied to the states; 2) predict(M), which predicts the future aggregate power consumed or supplied by M; 3) allocate(M), which redistributes predicted and actual power among the membership of M according to policies for power sharing; and 4) intervene(M), which translates allocations to actionable control forms and coordinates the enactment of the new controls. The GLS-GF protocol described in a subsequent section provides a detailed example of the primary IaP developed in this study. It harmonizes predictions for supply and demand at the highest level, relying on complex predictive models and optimization functions that take varying amounts of computation time. There are two major maladies that can occur in the grid process resulting from timing issues in the Level III protocols: 1) lagging, a failure of a Level III protocol to complete in time to enact interventions in response to legitimate source, sink, or storage events; and 2) thrashing, an over-intense sequence of protocol initiations causing interruption of an incomplete protocol transaction to begin another transaction. This results in an inconclusive global state schemata and a failure to enact timely Level III interventions. Because the aggregate generation and load processes are stochastic, hybrid simulation tools based on Monte Carlo techniques are the only feasible means to determine the operating envelope of the protocols. The simulation must capture state-space models and controls as well as discrete events arising from agent communications and reasoning. The goal of simulation is generally to determine bounds on convergence times for event-initiated interaction protocols given: 1) a set of policies for entitlements and apportionments; 2) choices of algorithms for prediction and optimization; and 3) a particular grid equipment inventory and configuration. Network communication latencies and computation times for algorithms are the prime contributors to protocol convergence times. The subsequent sections describe in more detail the individual functions and operations conducted by the respective cohorts and describe the overall flow of the GLS-GF protocol.

Critical and Elective Load Allocation

The apportionment of multiple loads by independent load agents under hard constraints on total power availability from variable generation is accomplished by a function that implements a critical/elective load selection strategy. This approach assumes each load center has an intelligent agent with explicit knowledge of devices, nameplate and dynamic power consumption values, demand schedules and patterns, possibly represented as probability distributions, and a means to produce credible load forecasts for some future time horizon. Each load agent has a fixed load inventory, $P_i^{total} = \{p_i^1, p_i^2, \ldots p_i^N\}$, of discrete loads that it may select or enable for energization through a switching vector $sw_i$. A load agent predicts and/or selects some salient critical subset of its loads, $P_i^{crit} \subseteq P_i^{total}$, based on its local historical and structural models and the current requirements for services. Each load agent informs the L-cohort of significant changes in its critical load subset asynchronously through network messaging. Therefore, the L-cohort periodically reaches consensus on the totalized critical load set, $P_L(t_k) = \Sigma P_i^{crit}$, which represents the unequivocal minimum critical load that must be serviced by the G-cohort over the next time epoch. The L-cohort also receives asynchronous network messages from the G-cohort that declare the unequivocal maximum power capacity of the grid, $P_G(t_k)$, over the next time epoch. The L-cohort computes the residual power, $P_R(t_k) = P_G(t_k) - P_L(t_{hd\,k})$, which indicates the global status of the grid power flow: critically underserved if $P_R(t_k) < 0$; or critically overserved if $P_R(t_k) > 0$.

Since $P_R(t_k)$ is unequivocal, if the grid is critically underserved, a storage allocation process (which includes multi-grid power sharing) must be invoked to meet the critical demand. If the grid is critically overserved, $P_R(t_k)$ must be apportioned among the members of the L-cohort based on a fair allocation and entitlement. There are many means to arrive at an entitlement, including service level agreements, functions of critical load history, coalition games, equal divisions, and auctions. But any set of entitlement rules must result in a convex set defined over the L-cohort membership, $\{\alpha_i\}|\Sigma\alpha_i=1$, so that the fraction of the residual grid power apportioned to each agent, $P_{iR}(t_k) = \alpha_i P_R(t_k)$, can then be used to select discrete loads from the agent's elective load inventory, $P_i^{elect} = P_i^{total}/P_i^{crit}$, where / denotes the relative set complement. The solution involves solving a binary integer linear program (NP-hard) that selects a subset of loads from $P_i^{elect}$ that meets but does not exceed the elective entitlement $P_{iR}(t_k)$:

$$P_j \in P_i^{elect} \left| \max_x c^T x,\; p^T x \leq P_{iR},\; x \in \{0, 1\}, \right.$$

where c is a weighting vector that measures the value of energizing the respective load, and x is a switching variable that selects the elements of $P_i^{elect}$ for enablement. If $c^T = 1^T$, all loads have equal value. If the sum of elective loads does not equal or exceed its entitlement, a secondary residual for each agent is given by $P_{iR2}(t_k) = P_{iR}(t_k) - x^T p$, $p_j \in P_i^{elect}$ that can be re-aggregated through an L-cohort consensus protocol and utilized according to a secondary entitlement policy. There are many possible policies for reallocation of secondary residuals, including some that return the unused power to the microgrid collective for allocation to charging storage elements or powering other microgrids.

S-cohort Storage Allocation

For microgrids with significant variable generation, the risk of a power supply shortfall is mitigated by power and energy storage. The S-cohort is concerned with the cooperative management of an ensemble of bi-directional storage elements (agents), possibly of different kinds (batteries, flywheels, fuel cells, natural gas turbines), that are connected directly to the DC bus. The elements may be charged from the bus when excess generation power is available and discharged into the bus when excess load power is needed. The S-cohort conducts a process that accomplishes the allocation of storage elements to the generation role, the load role, or a reserve role, in time to reduce bus voltage variance caused by an imbalance in generation capacity vs. load demand. The dynamic between the S-cohort, G-cohort, and L-cohort is illustrated in FIG. 5. The storage elements typically have different power capacities and dynamic responses, requiring complex model-based scheduling and optimization algorithms for effective management of the fluctuations in generation and supply. The function of the S-cohort is to coordinate the application of the various power and energy storage components to the bus, respecting their different capacities and dynamics, to achieve a single virtual storage element with properties not present in the individual elements. The scale-up costs associated with different storage technologies vary and suggest individual economies of scale for storage elements.

The S-agents at Level II and Level III share an abstract model of each storage element. For conceptual analysis, the models are identical and assume simple constant charging and discharging dynamics. In practice, dynamical models of specific classes of storage elements would be used that incorporate ancillary variables such as temperature and speed, and which respect durability and life cycle considerations for the elements as well. These realities introduce more complexity to the discussion of optimization algorithms and storage management rules that follow. In its simplest representation, the state-of-charge for a storage element is modeled by the triple: $SOC(a_i(t_k))=(e_i^{sto}, e_i^{max}, e_i^{min})$ and a role designator. FIG. 6 defines the various storage cohort roles for agents. An active storage agent (storage agents may also be taken off line) will be assigned to one of three roles at all times. Assignments to roles are made by the Level III agent process according to the state of generation and load balance on the bus and governed by a policy for allocation. The abstract function move(a,X,Y) moves an agent a from the set X to the set Y. A storage element also has an ideal maximum charging parameter and an ideal maximum discharging power parameter: $P_{cd}(a_i(t_k)) = (p_i^{chg}, p_i^{dis})$. In real storage systems these parameters would be represented as functions of SOC, voltage, temperature, and other device parameters. In general, a residual power calculation is performed by the Level III G and L agents to determine the need for additional generation or additional storage.

The exact protocol for harmonizing G, L, and S agents is discussed in the next section but involves the residual power discussed in the previous section: $P_R(t_k)=P_G(t_k)-P_L(t_k)$. If the grid is critically underserved, $P_R(t_k)<0$, the S-agent will conduct a G-recruitment action that attempts to add reserve storage elements to the generation role. In this version of S-cohort policy, storage is added to the generation role only if the critical loads are not served. If $P_R(t_k)>0$, then the L-agent will attempt to serve elective loads with the residual power. If any secondary residual power $P_{R2}(t_k)$ is left over after elective loads are met, the S-cohort will conduct an L-recruitment action that attempts to add storage elements to the load role. Note that this policy might starve the s-agents of charging time if there is never a secondary reserve. Therefore, the sum of critical and elective loads must not always exceed the available G-agent generation. This implies an overall G-L power balance in which the G-cohort produces power more than the L-cohort demands for critical loads, on the average. Alternative policies require periodic L-recruitment of storage elements treated as critical loads to ensure some minimal number of storage elements are charged to provide future predicted reserve generation. A deliberative scheduling algorithm within the S-cohort can accomplish this by adding a proxy agent to the L-cohort that represents the needed S-agent loads as critical loads that displace L-agent elective loads but do not induce G-recruitment. The latter requirement avoids the logically absurd condition of dual recruitment, in which energy is transferred between G-recruited and L-recruited storage elements instead of being used for servicing L-cohort loads. Recruitment strategies must satisfy an overall global condition on allocation: $s_G \neq \emptyset \Rightarrow S_L = \emptyset \wedge S_L \neq \emptyset \Rightarrow S_G = \emptyset$. That is, the S-cohort must be either providing power or absorbing power at any given time, but not both. There are many potential algorithms for L and G recruitment that account for different charging and discharging behaviors and policy choices. The algorithms considered here do not perform any preliminary formulation or problem preconditioning. Practical recruitment algorithms will have more embedded logic and heuristics, and will probably involve dynamic programming if the planning horizon is expanded to more than a single future time increment. The straightforward approach is to solve the binary linear programming problem with respect to the energy variables involved:

---

L - recruitment ($P_{R2} > 0$) :
$P_{res} = |P_{R2}|$
$p_i = p_i^{chg}$; $et_i = p_i T_h$
Find S' = $\{a_i \in R \mid x_i a_i \neq 0\}$ , where
$\min_x c^T x$, $p^T x \leq P_{res}$, $c_i = (e_i^{sto} - e_i^{min})$, $et_i \geq (e_i^{max} - e_i^{sto})$, $x \in \{0, 1\}$
If S' $\neq \emptyset$, then move($a_i$,S',$S_L$)

G - recruitment ($P_R < 0$) :
$P_{res} = |P_R|$
$p_i = p_i^{dis}$; $et_i = p_i T_h$
Find S' = $\{a_i \in R \mid x_i a_i \neq 0\}$, where
$\min_x c^T x$, $p^T x \leq P_{res}$, $c_i = (e_i^{max} - e_i^{sto})$, $et_i \geq (e_i^{sto} - e_i^{min})$, $x \in \{0, 1\}$
If S' $\neq \emptyset$, then move($a_i$,S',$S_G$)

---

In the case of L-recruitment, the S-agent searches for a subset of reserve storage elements that can collectively absorb at most the energy increment specified by $P_{R2}$ over the next time horizon $T_h$, favoring elements with a lower relative SOC. This policy minimizes the threat to the current critical and elective loads, while maximizing the use of uncharged storage elements. For G-recruitment, the agent searches for a subset of reserve storage elements that can collectively supply at least the energy increment specified by $P_R$ over the next time horizon $T_h$, favoring elements with a higher relative SOC. This policy minimizes the threat of critically underserved loads, while maximizing the use of charged elements. An alternate response to a critically underserved L-cohort ($P_R<0$) is to dismiss any L-recruited storage elements from the bus, thereby removing storage-imposed load and providing additional access to natural G-cohort generation for the L-cohort critical loads. The dual approach is suggested as a response to a surplus secondary residual ($P_{R2}>0$) involving dismissal of G-recruited storage elements to enable G-cohort generation sources to more closely match the critical and elective loads. The algorithms for dismissal from the bus by a Level III intervention are:

---

L - dismissal ($P_R < 0$) :
$P_{res} = |P_R|$
$p_i = p_i^{chg}$; $et_i = p_i T_h$
Find S' = $\{a_i \in S_L \mid x_i a_i \neq 0\}$, where
$\min_x c^T x$, $p^T x \leq P_{res}$, $c_i = (e_i^{max} - e_i^{sto})$, $et_i \geq (e_i^{sto} - e_i^{min})$, $x \in \{0, 1\}$
If S' $\neq \emptyset$, then move($a_i$,$S_L$,R)

G - dismissal ($P_{R2} > 0$) :
$P_{res} = P_{R2}$
$p_i = p_i^{dis}$; $et_i = p_i T_h$
Find S' = $\{a_i \in S_G \mid x_i a_i \neq 0\}$, where
$\min_x c^T x$, $p^T x \leq P_{res}$, $c_i = (e_i^{sto} - e_i^{min})$, $et_i \geq (e_i^{max} - e_i^{sto})$, $x \in \{0, 1\}$
If S' $\neq \emptyset$, then move($a_i$,$S_G$,R)

In the case of L-dismissal, the agent searches for a subset of L-recruited storage elements that collectively absorb at least the energy increment specified by $P_R$ over the next time horizon $T_h$, favoring elements with a higher relative SOC. For G-dismissal, the agent searches for a subset of G-recruited storage elements that collectively supply at most the energy increment specified by $P_{R2}$ over the next time horizon $T_h$, favoring elements with a lower relative SOC. The suggestion of the dismissal actions brings up the issue of whether these reactive policies and algorithms be "tuned" to ensure that stored power will be available when demanded, and that residual power will be utilized when available, or alternatively, that storage elements will never be uniformly discharged to the point of depletion nor be perpetually charged to maximum capacity. The analysis clearly depends on the net energy in the $$P_R(t_k) \text{signal}, E_R(t_k) = \int_0^{t_k} P_R(t_k) dt,$$

and the aggregate capacity of the storage elements. The system can be investigated through analysis and simulation of the stochastic processes driving changes in generation and load under conditions that adjust the amount and dynamics of storage. Stabilization of the bus supply is still possible using traditional dispatchable generation. Fuel-based generation equipment is considered to be in the class of storage elements, not generation elements. Since fueled generators cannot be regenerated by the bus, they are guarded from L-recruitment in the allocation algorithms. In the current design, a fuel-based generator is captured as a storage element with an adjustable $e_i^{max}$ characteristic that can make it more or less favored in the reserve set eligible for G-recruitment. If $e_i^{max}$ is made very large w.r.t. $e_i^{sto}$, it will be deprecated and a last resort for G-recruitment, a situation that is desirable when reduction of combustion emissions is an important criterion. This concept can be elaborated upon by further creative modifications to the $c_i$ cost/value coefficients and side constraints in the optimizations. Similar considerations can apply to L-recruitment policies as well. The stored energy component of the SOC model of a bus-recruited agent is updated by the Level II agent according to an energy gain or loss increment $$dE_i = \int_{t_k}^{t_{k+1}} v_i(t) j_i(t) dt,$$

where v(t) and j(t) are voltage and current measurements taken at the storage element port to the bus by the Level I agent. The update rule is determined by the role as follows:

if $a_i \in S_L$, $e_i^{stored} = e_i^{stored} + dE_i$,
$e_i^{stored} \geq e_i^{max} \rightarrow e_i^{stored} = e_i^{max}, a_i \in S_R$ if $a_i \in S_G$, $e_i^{stored} = e_i^{stored} - dE_i$,
$e_i^{stored} \leq e_i^{max} \rightarrow e_i^{stored} = e_i^{max}, a_i \in S_R$ The element is tested at update time to determine if it should be removed from the bus to the reserve set $S_R$. This particular process for managing a storage element requires movement to the reserve $S_R$ prior to becoming eligible for recruitment. The rationale for the intermediate lodging of dismissed elements is that it allows an agent preparation of a storage element prior to role-reversal according a device-specific task. This may be necessary to prevent damage, to set up different charging or discharging circuitry, or otherwise coerce the element into a known state. Any recruitment of an s-element determined at Level III must be specified to the Level II agent in an intervention action. The Level II agent must enact a self-determined change or a Level III-directed change by an intervention action to the Level I agent, which is then actuated by the Level I agent (opening/closing switches, adjusting duty cycles, etc.). At this point in the discussion, the only means for an element to be dismissed from the bus once allocated in either role is to become depleted or fully charged, thereby triggering dismissal by the Level II agent. The autonomic dismissal of an element by a Level II agent will disrupt the Level III status of the S-cohort, so dismissal requires notification of the Level III S-agent by the Level II agent, preferably in advance by exception reporting of an event indicating "90% charged" or "5 seconds to depletion", or some event with similar semantics useful to preparing the GLS agents for the change in bus membership and power balance. The broader implication is that the S-cohort will have to asynchronously initiate an intracohort protocol with the G and L cohorts to drive an update in the power balance status. Note that this rounds out the possible actors that can initiate a power balance protocol by including the S-cohort. Moreover, if the microgrid has an intragrid power sharing agreement with other microgrids, the S-cohort has additional sources or sinks representing the other microgrids. Unused power capacity available after all load and storage requirements have been met within a grid over the next horizon $T_h$ can be allocated to other grids based on an intragrid entitlement policy that specifies the respective power allocated to other grids from the supplier grid. The policy must specify the conditions under which power will be transferred to a particular grid, and determine the apportionment of the excess power among competing microgrids if there are more than one. Conversely, if the microgrid cannot meet its critical loads after the S-cohort intervention, the excess critical load available over the next horizon can be allocated to one or more external grids for service according to an entitlement policy that determines the apportionment of demand among potential supplier grids.

Figure 8:
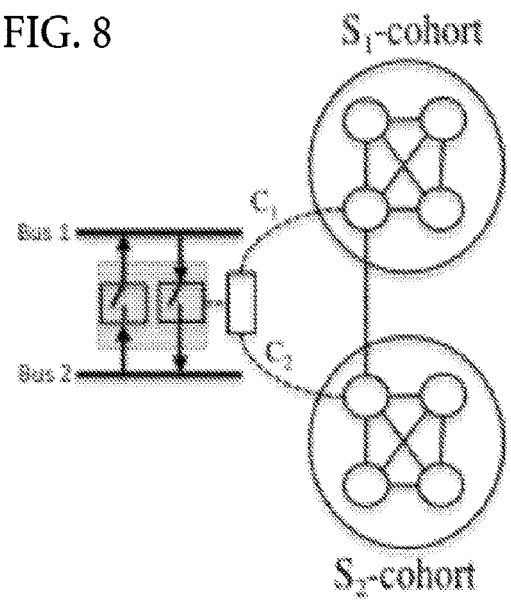
FIG. 8 illustrates s-cohort cooperative enablement of power flow.

The current design represents external grids within a grid S-cohort as a proxy agent with dual s-elements, one for the generation role and one for the load role. The interconnections are managed by the respective S-agents as shown in FIG. 7. A grid $MG_1$ that has excess energy to supply to another grid $MG_2$ will have a generation s-element in the set R of $MG_2$, guarded from L-recruitment, with the SOC and $P_{cd}$ structures instantiated with the apportioned values for the next time horizon. The element will be considered during the G-recruitment process for $MG_2$, treated as any other charged element and recruited to the generation role if selected. If recruited, the element is connected to the bus by interventions sent by the Level I agent. Note that power flow between grids is a consensual decision and must be enabled by both grids. FIG. 8 shows the logical structure for grid-to-grid power flow enablement. Level I agents on the respective grids must both vote positively (commands $C_1$ and $C_2$ in FIG. 8) to determine the flow direction. Interlock logic in the power tie prevents interconnection that allows power flows in both directions within an epoch to prevent dual recruitment.

The priority of selection of remote power from a grid's reserve can be adjusted by manipulation of the c and r weights and the side constraints in the S-cohort allocation process described above. There are significant policy issues to be refined in the ultimate algorithms for power sharing. In general, preferences for local power over remote power encourage autonomy and discourage interdependencies among microgrids. This policy is consistent with the principle of locality inherent in the microgrid concept and utilizes remote power only as a last resort for critical loads. An interesting special case arises when trading off locally fueled generation resources with remote power, especially if minimization of $CO_2$ is a goal. The entitlement and allocation negotiations will require additional data sharing regarding electricity source mixtures from candidate grids that allocate undesirable environmental burdens for remote power, along with more complicated multi-round negotiation mechanisms for determining power sharing contracts. The logical extension of this concept leads to real-time environmental declarations for power mixes in microgrids that explicitly indicate the percentages of power from each generation source and their corresponding life-cycle inventories of environmental burdens. In a commercial microgrid, energy cost allocations would also be included. Microgrids that export loads to other microgrids operate in an analogous manner. The target supplier grid holds a proxy s-element, guarded from G-recruitment, which represents the desired load to be supplied to the consumer grid. L-recruitment proceeds according to the normal process, but as in the case of remote G-recruitment, selection weights can be manipulated to encourage locality and autonomy, interconnecting the grids only as a last resort. Note that this S-cohort proxy representation scheme also covers the case in which one of the "microgrids" is the actually the bulk utility grid. A proxy agent representing the utility grid in the S-cohort protocols enables the selection of the use of utility power dynamically from among the set of storage elements and other microgrids.

Since the generation and load mix on a microgrid is dynamic, the excess supply or demand within a grid may change in response to local events, within the current epoch or for the next epoch, requiring reconsideration of the power sharing contract. For example, an equipment failure or natural event may occur that reduces the residual power on a grid. A dilemma may arise that requires a grid to either renege on its promise to supply another grid, or fail to meet its local critical loads. A similar situation arises when excess load is reduced. A grid may cancel a demand on another grid if excess power becomes available unexpectedly. Note that in either case, the S-agent from a grid must signal a change in its status and initiate asynchronously a re-computation of the global power balance.

As discussed previously, the G and L cohorts can initiate a protocol in response to a change in generation capacity or in critical demand, respectively. The Level III protocols that accomplish harmonization of all three events are discussed in the next section.

GLS Generation Following Protocol

Microgrids that include significant renewable sources introduce considerable variability into the grid supply, requiring storage to redistribute energy over time, possibly including dispatchable generation sources. In a Generation Following Policy, loads and storage elements connected to the grid bus change their power status in response to changes in the aggregate generation capacity advertised by the G-cohort. In contrast to conventional load-following policies in which generation resources are scheduled according to load forecasts, generation following utilizes predictors for variable generation resources and sets an unequivocal maximum value $P_{gen}(t)$ for generation power over some future time horizon. The G-cohort member agents represent the dispatchable and non-dispatchable variable sources with time-varying power capacities, usually with a stochastic component that introduces some uncertainty in their respective prediction models. The native prediction models may update generation predictions, but predicted maximum power values for the G-cohort are never reallocated in response to changing loads or other events of origin exogenous to the G cohort.

The rationale for not reconsidering or reallocating generation under normal operations is that the G cohort represents the unpredictable energies of natural processes (wind, sun, waves and currents) and is therefore beyond human influence and subject to imperfect prediction. However, loads are potentially controllable by software load agents with the proper intercessory switching through interactions that influence human principals to modulate their load selections. If predictions of available natural power are reasonably accurate, using these predictions to drive the allocation of loads and storage results in a simpler power planning protocol that makes maximum use of environmentally-friendly variable generation and provides load-agent technology that encourages conservation behaviors in human users. The GFP approach centers the control system architecture on responding to the changes in power capacity in the variable generators. The aggregate generation process is treated as the primary stochastic disturbance in the system. Loads are prioritized and adjusted to meet the available generation. Storage agents manage conflicts that arise when generation is inadequate to meet critical loads and enable intergrid power sharing. FIG. 9 shows the G, L, and S cohorts and the message exchanges among the cohorts. Intracohort messages are described in FIG. 10. The goal state of the protocol is twofold: 1) every agent is aware of every other agent's power supply and demand values; and 2) critical loads and as many elective loads as possible are adequately supplied. The GLS-GF protocol is M2M mixed-initiative protocols that incorporate unsolicited notification with fixed subtask initiative to maintain bus power balance while respecting bus voltage constraints. A new instance of the protocol may be initiated by the G, L or S cohort in response to source, sink, or grid events. The following cases cover the protocol initiation events.

Initiation case 1: G-initiation—The G-agent initiates a new instance of the protocol, caused by a source event detected by one or more g-agents that signals a significant decrease or increase in the aggregate maximum local power generation capacity. The source event initiates an intercohort protocol among g-agents that results in an update to the global state schema for the G cohort in which all agents know the expected maximum power capacities of the entire G-cohort. The G-agent then sends $m_{GL}$ and $m_{GS}$ messages containing the new power capacity values to the L-agent and S-agent, respectively. Since the G-agent does not reconsider its predictions based on responses from the L and S agents (it does update its predictions based on endogenous conditions), the G-agent then awaits responses from the S and L agents, $m_{LG}$ and $m_{SG}$, so it can update its interventions.

The G-agent interventions must account for any storage power declared in the $P_{sgenpred}$ value from the S-agent in its power apportionment calculations. G-agent interventions may also require total bus load, calculated from the sum of $P_{loadpred}$ in $m_{LG}$ and $P_{sloadpred}$ in $m_{SL}$ for model-based control algorithms.

Initiation case 2: L-initiation—The L-agent initiates a new instance of the protocol in case a sink event is detected by an l-agent that indicates a significant decrease or increase in the aggregate load power demand. An intercohort protocol is completed and a new global state schema obtained in which every agent knows the load values of the cohort. The L-agent then updates its allocations (status) based on the current values of the storage and generation power. The L-agent sends $m_{LG}$ and $m_{LS}$ messages containing new critical and elective load and residual power values to the G-agent and S-agent respectively. Since in this version of the GLS protocol the critical loads are unequivocal, the L-agent will update its interventions based on the new global schema, always actuating its critical loads.

Initiation case 3: S-initiation—The S-agent initiates a new instance of the protocol when a sink or source event occurs that indicates a change in the generation or load contributed by the S-agent that is significant to the global power balance. This can be a depletion event in which a storage element can supply no more energy, or it can be a top-off event in which the storage element cannot store or absorb more energy. An intercohort protocol is completed, arriving at a global state schema for the S cohort. The S-agent updates its allocations to the bus to meet the current residual power (a surplus or deficit), and sends $m_{SL}$, $m_{SG}$, and $m_{SS}$ messages containing new bus generation and/or load values to the G-agent, L-agent, and remote grid S-agent respectively. Since remote grids are represented by proxy s-agents, a change in the power or load allocation to another grid is signaled by the local grid to the remote grid by a $m_{SS}$ message, causing S-initiation in the remote grid.

The responses of the respective cohorts to a complementary protocol initiation by another cohort is determined by the primary residual power as follows.

Response case 1: G-response—the G-agent updates only its interventions based on a $m_{LG}$ or $m_{SG}$. The interventions are calculations of the proper power apportionments among the G-cohort based on the share of the total demand serviced by the G-cohort. The total demand may be shared with the G-recruits in the S-cohort, so knowledge of the power supplied by the S-cohort is necessary for proper apportionment. Model-based calculations for power apportionment may also depend on predicted values for the total load to determine the approximate operation state of the system.

Response case 2: L-response—The L-agent updates its status in response to a change in generation signaled by either the G or S cohorts. The L-cohort must shed elective load if generation is decreased, or add elective load if generation is increased. If critical loads cannot be met because of a change in generation, then the grid is in a failure mode.

Response case 3: S-response—The S-agent updates its status in response to a change in either generation or load. Either case causes an update in the S-cohort allocations. If critical load increases, the S-agent may G-recruit storage. If the generation increases, the S-agent may L-recruit. The response may also affect any remote grids that have contracted for residual generation or load, so messaging to remote grids may be an element of the response.

What is claimed is:

1. A system for managing power using three distributed control agent classes in a multi-agent system, wherein:
    at least one generation agent senses and measures an increase or decrease in an aggregate maximum local power generation capacity;
    the at least one generation agent sends an intracohort message containing the new aggregate maximum local power capacity values to at least one load agent and at least one storage agent;
    the at least one load agent responds to the intracohort message from the at least one generation agent by sending a message to all members of a load cohort to initiate an intercohort protocol to determine new critical and elective aggregate load values and power residuals based on a difference between the aggregate maximum local power generation capacity and an aggregate load;
    the at least one load agent responds to the intracohort message from the at least one generation agent containing the new aggregate maximum local power generation capacity values by actuating its critical loads based on current values of storage and generation power;
    the at least one load agent sends an intracohort response message containing the new critical and elective aggregate load values and power residuals to the at least one generation agent and the at least one storage agent;
    the at least one storage agent responds to the intracohort message from the at least one generation agent and the intracohort response message from the at least one load agent by updating its allocations of energy to a bus to meet a current residual power value;
    the at least one storage agent responds to the intracohort message from the at least one generation agent and the intracohort response message from the at least one load agent by initiating an intercohort protocol to determine recruitment or dismissal of storage elements to or from the at least one generation agent or to or from the at least one load agent to address a deficit or surplus of power in the current residual power value;
    the at least one storage agent sends an intracohort message containing the new bus energy allocation and the recruited or dismissed storage elements to the at least one generation agent, the at least one load agent, and at least one remote grid storage agent;
    the at least one generation agent responds to the intracohort message from the at least one storage agent by initiating an intercohort protocol to include the recruitment of storage elements to the at least one generation cohort and calculating the aggregate generation power;
    the at least one generation agent updates its generation control interventions based on the intracohort messages from the at least one load agent and the at least one storage agent;
    the at least one load agent responds to the intracohort message from the at least one storage agent by shedding or adding elective load.

2. The system of claim 1, wherein the at least one load agent's critical loads are prioritized and adjusted to meet the available generation of energy.

3. The system of claim 1, wherein the at least one load agent's elective loads are prioritized and aggregated to use available residual energy.

4. The system of claim 3, wherein the at least one load agent's set of aggregated fixed elective loads that meet, but do not exceed, the available residual generation are selected through a combinatorial optimization processor.

5. The system of claim 1, wherein the at least one storage agent enables intergrid power sharing by sending the message to the at least one remote grid storage agent.

6. The system of claim 1, wherein the at least one storage agent schedules storage components in source or load roles based on a reserve power margin relationship between the generation agent aggregate power and the load agent aggregate power.

7. The system of claim 1, wherein the at least one storage agent recruits storage to a generation cohort if the generation cohort produces less power than a load cohort demands.

8. The system of claim 7, wherein the at least one storage agent's set of recruited fixed-power storage assets that meet or exceed the generation deficit are selected by a combinatorial optimization processor.

9. The system of claim 1, wherein the at least one storage agent dismisses storage from a load cohort if the generation cohort produces less power than a load cohort demands.

10. The system of claim 9, wherein the at least one storage agent's set of aggregated dismissed loads that meet or exceed the deficit in aggregated generation is selected by a combinatorial optimization processor.

11. The system of claim 1, wherein the residual power is a surplus or deficit.

12. The system of claim 11, wherein the at least one storage agent's set of aggregated dismissed loads that meet or exceed the deficit in aggregated generation is selected by a combinatorial optimization processor.

13. The system of claim 1, wherein the at least one load agent sheds elective load if generation is decreased.

14. The system of claim 1, wherein the at least one load agent adds elective load if generation is increased.

15. The system of claim 1, wherein the at least one load agent initiates an intracohort message to the at least one generation agent and the at least one storage agent to report a change in the critical or elective aggregate loads and the at least one generation agent the at least one storage agent respond to the message by recalculating the generation allocation and storage recruitment or dismissal from the generation role.

16. The system of claim 1, wherein the at least one storage agent initiates an intracohort message to the at least one load agent and the at least one generation agent to report a change in the status of a storage element state-of-charge and stored power or energy capacity, and the at least one generation agent and the at least one load agent respond to the message by recalculating the generation allocation, storage recruitment or dismissal, and the critical elective load allocations.

17. The system of claim 1, wherein the at least one storage agent controls a device selected from the group consisting of a battery, a flywheel power storage device, a capacitor, an inductor, a semiconductor, a bidirectional DC power converter, an electric vehicle, a hybrid vehicle, and combinations thereof.

18. The system of claim 1, wherein the at least one generation agent controls a device selected from the group consisting of a diesel genset, a solar photovoltaic panel or array, a wind-powered turbine and generator assembly, a wave-powered generation system, a natural-gas turbine power generator, a coal-fired power generator, a hydroelectric generator, a fuel cell, a small-scale nuclear generator, an electric vehicle, a hybrid vehicle, and combinations thereof.

19. The system of claim 1, wherein the at least one load agent controls a device selected form the group consisting of a breaker, a switch, a light, a heating unit, an air conditioning unit, a refrigerator, an AC to DC power charger, an audio system, an electronic media player, an LCD television display, a boost converter, a buck converter, a bidirectional DC power converter, a motor, a solenoid, an electric vehicle, a hybrid vehicle, and combinations thereof.

20. The system of claim 1, wherein the grid and components are based on an alternating current and the power levels are computed and transmitted by the at least one generation agent, the at least one load agent, and the at least one storage agent, and the agents are the active power components of the alternating current power.

* * * * *